United States Patent [19]
Yrjönen et al.

[11] Patent Number: 5,416,328
[45] Date of Patent: May 16, 1995

[54] METHOD FOR EVALUATING SAMPLE ACTIVITIES IN A MULTIDETECTOR LIQUID SCINTILLATION COUNTER

[75] Inventors: Tapio Yrjönen, Turku; Heikki Kouru, Raisio, both of Finland

[73] Assignee: Wallace Oy, Turku, Finland

[21] Appl. No.: 300,083

[22] Filed: Sep. 2, 1994

Related U.S. Application Data

[63] Continuation of Ser. No. 969,172, Feb. 12, 1993, abandoned.

[51] Int. Cl.$^6$ ............................................. G01T 1/204
[52] U.S. Cl. .................................... 250/362; 250/328
[58] Field of Search ...................... 250/328, 362, 364

[56] References Cited

U.S. PATENT DOCUMENTS

| | | | |
|---|---|---|---|
| 4,085,325 | 4/1978 | Atallah et al. | 250/328 |
| 4,418,281 | 11/1983 | Horrocks | 250/328 |
| 4,700,072 | 10/1987 | Oikari et al. | 250/328 |
| 5,120,962 | 6/1992 | Rundt et al. | 250/328 X |
| 5,134,294 | 7/1992 | Rundt et al. | 250/364 |
| 5,194,735 | 3/1993 | Yrjönen et al. | 250/364 X |

Primary Examiner—Constantine Hannaher
Assistant Examiner—Edward J. Glick
Attorney, Agent, or Firm—Adduci, Mastriani, Schaumberg & Schill

[57] ABSTRACT

A method for the evaluation of sample activities in multidetector liquid scintillation counters. All prepared quench curve standards are measured only in one reference detector in order to establish the relationship between the quench levels and the counting efficiencies. In addition, only two of the standards, preferably those with lowest and highest level of quench, are measured in every detector in order to establish the relationship of the quench levels between the reference detector and any other detector and in order to establish the relationship of the counting efficiencies between the reference detector and any other detector. The activities of unknown samples are evaluated by utilizing the predetermined relationships.

4 Claims, 3 Drawing Sheets

METHOD FOR EVALUATING SAMPLE ACTIVITIES IN A MULTIDETECTOR LIQUID SCINTILLATION COUNTER

This application is a continuation of application Ser. No. 07/969,172, filed Feb. 12, 1993, (now abandoned).

BACKGROUND OF THE INVENTION

Liquid scintillation counters are commonly used to measure the count rate or activity of samples containing low energy beta particles or corresponding particles emitting radionuclides such as tritium, iodine-125, carbon-14, sulphur-35, calcium-40 and chromium-51.

The range of the low energy beta particles in the sample is in general few tens of micrometers at the most. As a consequence, the sample to be measured has to be placed in direct contact with a scintillation medium by dissolving or suspending the sample within the liquid scintillation medium in a container so that the emitted beta particles can interact with the molecules of the liquid scintillation medium, which comprises a solvent or solvents and a solute or solutes which constitutes a small weight percent of the solution. In this interaction process most of the kinetic energy of the interacted beta particle is absorbed by the solvent and then transferred to the solute which emits scintillation photons, whose amount is proportional to the energy of the interacted beta particle. These scintillation photons are detected by two photomultiplier tubes, operating in coincidence, produce electric pulses. The sum pulse height is proportional to the energy of the interacted beta particle.

When measuring sample activities with liquid scintillation counters, the basic problem is the reduction of counting efficiency due to the quenching of the sample, which can be classified in two main types: a chemical quench and a color quench. The chemical quench is a phenomenon in which the solution formed by the sample and the scintillation medium contains some impurities, which reduce the efficiency of the counting system to detect the emitted beta particles by absorbing them. The color quench is a phenomenon in which the solution formed by the sample and the scintillation medium contains some impurities which absorb produced scintillation photons. The consequence of this reduces also the counting efficiency.

It is known in liquid scintillation counting that the reduction of counting efficiency due to the quenching of the sample can be corrected by means of a quench curve which describes the relationship between the counting efficiency and amount of the quench of the sample. Normally liquid scintillation counters are provided with one detector and the quench curve is obtained by measuring a number of standards with identical activities but different quench levels in the detector. Difficulties are be encountered when a liquid scintillation counter is provided with a plurality of detectors: all standards should be measured in each detector due to the variations in energy and efficiency responses of the detectors. This is a time consuming procedure.

SUMMARY OF THE INVENTION

An object of this invention is to produce a novel method which differs from known techniques, for evaluation of sample activities in multi-detector liquid scintillation counters. According to the present method all quench curve standards are measured only in one detector and only two standards are measured in every detector. Thus remarkable time savings is obtained compared to known techniques.

DESCRIPTION OF THE PREFERRED EMBODIMENTS

A number of standards with identical activities but different quench levels are prepared. All of the standards are measured in the first detector of the multidetector liquid scintillation counter. This establishes the relationship illustrated in FIG. 1 between a quench related quantity called SQP(I) and efficiency. This relationship is stored in the memory of the apparatus. SQP(I) is a measure of the spectrum location (the centroid of the observed spectrum) and varies as the quench changes. It should be understood that instead of SQP(I) any other quench parameter can be applied.

Two of the standards, preferably those with the lowest and highest level of quench, are measured in every detector. The purpose of this is to establish the relationship illustrated in FIG. 2 of SQP(I) values between the first detector and any other detector and to establish the relationship illustrated in FIG. 3 of the efficiency values between the first detector and any other detector. These relationships are stored in the memory of the apparatus. The applicants have observed that these relationships are linear functions so that two points obtained with two standards are sufficient to define the relationships.

Figure 1:
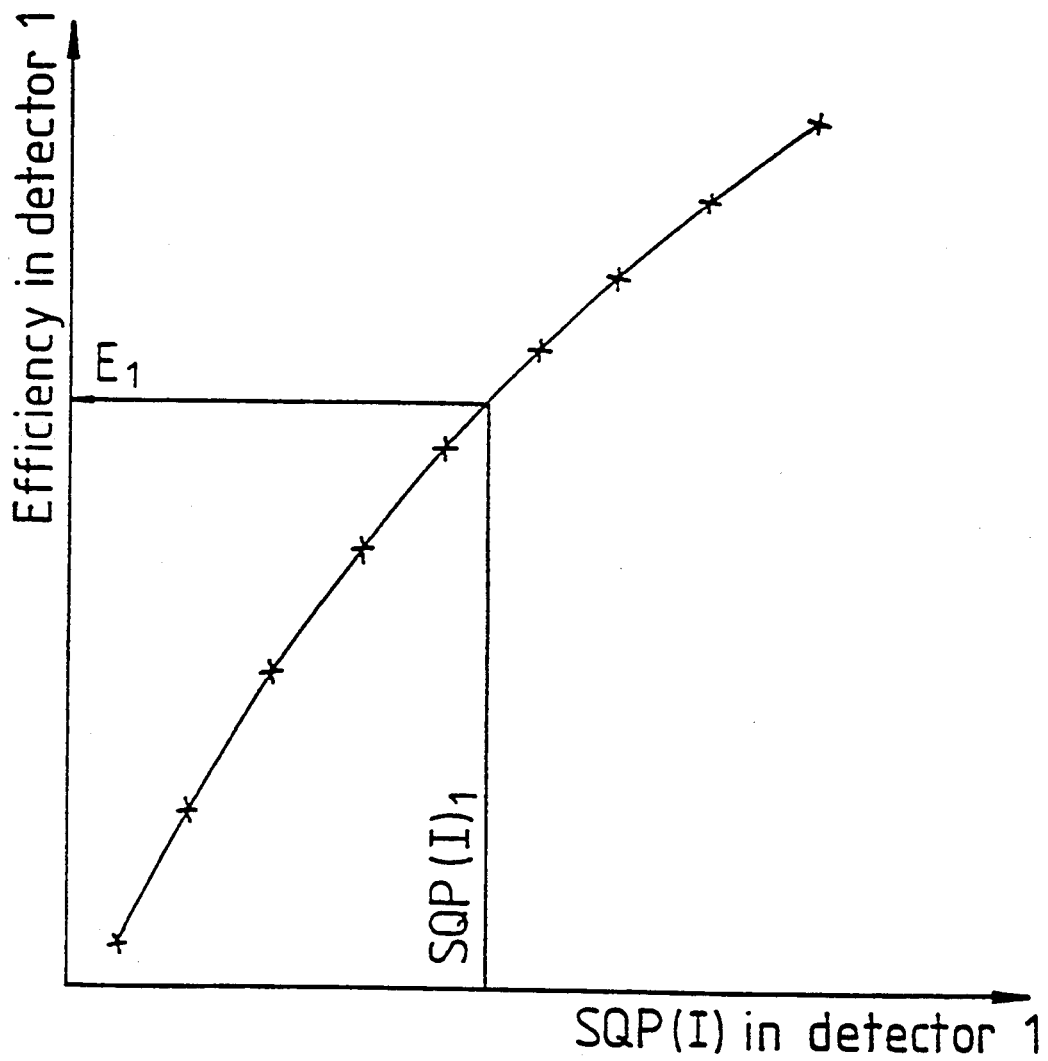
FIG. 1 is the diagram which illustrates a relationship between the counting efficiency and the SQP(I) in detector 1.
Figure 2:
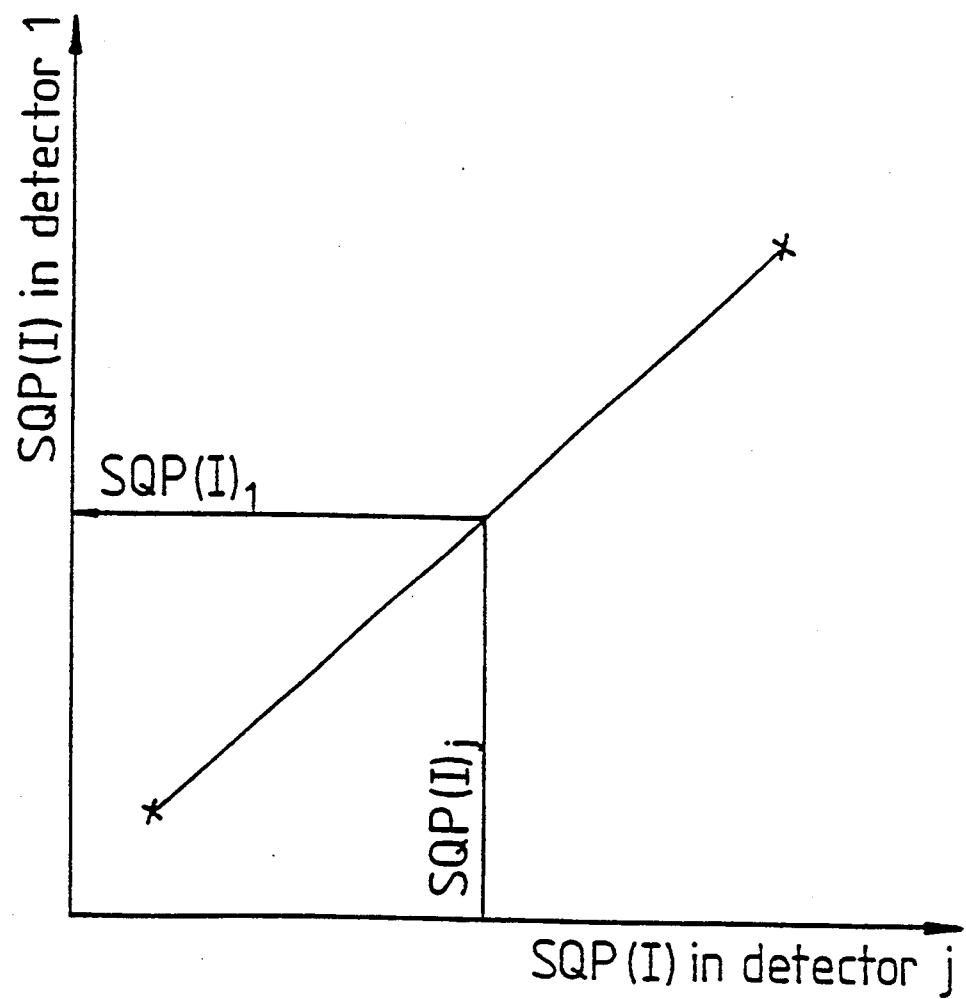
FIG. 2 is the diagram which illustrates a relationship between the SQP(I) in detector 1 and the SQP(I) in detector J.
Figure 3:
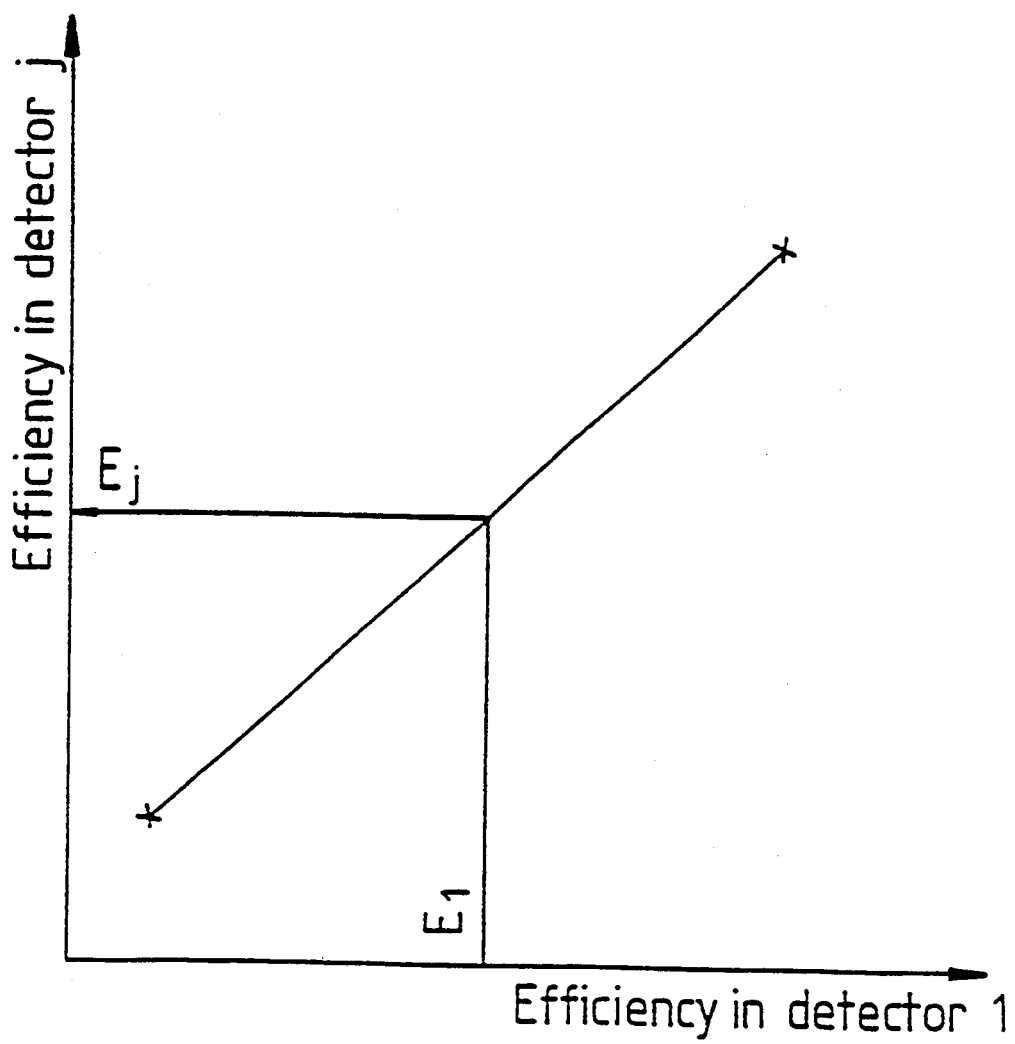
FIG. 3 is the diagram which illustrates a relationship between the counting efficiency in detector j and the counting efficiency in detector 1.

The actual sequence of events for evaluating activities of unknown samples is as follows:

1. The SQP(I) value and count rate of the sample are measured with any detector.
2. The SQP(I) value is converted as shown in FIG. 2 to correspond to the SQP(I) value of the first detector using the relationship of SQP(I) values of the actual detector and the first detector.
3. The converted SQP(I) value is used as shown in FIG. 1 to read off the detector 1 efficiency from the quench curve made for samples counted with detector 1.
4. The efficiency value is converted as shown in FIG. 3 to correspond to the actual detector efficiency using the relationship of the efficiency values of the first detector and the actual detector.
5. The measured count rate in the actual detector is divided by the actual detector efficiency to obtain the activity of the measured sample.

The method according to the present invention is not confined to the above description alone, but it may show even considerable variation within the scope of the patent claims.

We claim:

1. A method for evaluating the activity of an unknown sample in a multidetector liquid scintillation counter, said method comprising the steps of:
   (1) storing in a memory of a multidetector liquid scintillation counter:

(a) a relationship between quench level and counting efficiency for a first reference detector;
(b) a relationship between quench levels of said reference detector and a measuring detector for each measuring detector of said multidetector counter; and
(c) a relationship between counting efficiencies of said reference detector and a measuring detector for each measuring detector of said multidetector counter;

(2) measuring a quench level and a count rate of the unknown sample with a measuring detector of said multidetector counter;

(3) converting the quench level of the unknown sample measured in (2) to the corresponding quench level for said reference detector using the relationship between quench levels of said reference detector and said measuring detector stored in (1)(b);

(4) determining the counting efficiency of said reference detector corresponding to the quench level of said reference detector determined in (3) using the relationship between quench level and counting efficiency of said reference detector stored in (1)(a);

(5) converting the counting efficiency of said reference detector determined in (4) to the corresponding counting efficiency of the measuring detector used in (2) using the relationship between the counting efficiencies of said reference detector and said measuring detector stored in (1)(c); and (6) dividing the count rate of the unknown sample measured in (2) by the counting efficiency of said measuring detector determined in (5) to obtain the activity of the unknown sample.

2. The method of claim 1, wherein the relationship between quench level and counting efficiency of said reference detector stored in (1)(a) is established by measuring a plurality of standards with identical activities but different quench levels with said reference detector.

3. The method of claim 2, wherein the relationship between quench levels of said reference detector and a measuring detector for each measuring detector of said multidetector counter and the relationship between counting efficiencies of said reference detector and a measuring detector for each measuring detector of said multidetector counter is established by measuring two of said standards with each measuring detector.

4. The method of claim 3, wherein said two of said standards measured with each measuring detector are the standards with the highest and lowest quench levels.

* * * * *